United States Patent [19]

Charet et al.

[11] Patent Number: 5,059,058
[45] Date of Patent: Oct. 22, 1991

[54] WIPER ASSEMBLY LATCH

[75] Inventors: Pierre Charet; Govelio R. Gonzalez, both of Miami, Fla.; John M. White, Dumfries, Va.

[73] Assignee: Rally Manufacturing, Inc., Miami, Fla.

[21] Appl. No.: 550,748

[22] Filed: Jul. 10, 1990

[51] Int. Cl.$^5$ ............................................. B25G 3/18
[52] U.S. Cl. .................................. 403/322; 403/329; 403/69; 15/250.32
[58] Field of Search ................... 403/322, 329, 69, 70; 15/250.32

[56] References Cited

U.S. PATENT DOCUMENTS

| | | | |
|---|---|---|---|
| 3,866,260 | 2/1975 | Cone | 15/250.32 |
| 4,118,825 | 10/1978 | Hoebrechts et al. | 15/250.32 |
| 4,178,651 | 12/1979 | Mayer | 15/250.32 |
| 4,503,580 | 3/1985 | Sharp | 15/250.32 |
| 4,649,591 | 3/1987 | Guerard | 15/250.32 |

FOREIGN PATENT DOCUMENTS 3423317 1/1986 Fed. Rep. of Germany ... 15/250.32

Primary Examiner—Andrew V. Kundrat
Attorney, Agent, or Firm—Longacre & White

[57] ABSTRACT

A latch assembly for connecting a pin type connector to a wiper assembly. The latch includes two upstanding end portions which include retainer elements at the ends thereof. A flexible body portion including a pin retainer section connects between the upstanding end portions. The latch inserts into a longitudinal cavity within the wiper assembly and intersects a transverse passageway which accommodates the pin connector. The flexible body portion of the latch urges against the pin connector and retains the pin within the wiper assembly. The flexible body portion may include laterally extended wings to aid in urging the flexible body portion out of contact with the inserted pin connector.

2 Claims, 1 Drawing Sheet

WIPER ASSEMBLY LATCH

FIELD OF THE INVENTION

The present invention relates to the field of latching mechanisms for relating a pin member to a transversely positioned member having a hole therethrough. More particularly, the present invention relates to a latch assembly for connecting a vehicle wiper assembly to a pin connector.

BACKGROUND OF THE INVENTION

The prior art discloses many types of latching mechanisms for securing wiper assemblies to wiper arms. A common type of wiper arm connection piece is a pin type connector. The connector usually comprises a pin of fixed length and diameter except for a section of the pin along the mid section which somewhat reduced in diameter. The pins are commonly sized, i.e., more than one auto manufacturer using the same size. However, two sizes of the pin have developed over the years, and are now commonly encountered on a variety of vehicle types.

A producer of replacement wiper assemblies must provide a replacement part which meets or exceeds the original performance specifications of the manufacturer if the replacement provider hopes to lure replacement buyers to their products. In pursuit of this goal, one of the critical requirements is that the wiper assembly be securely attached to the vehicle wiper arm for optimum performance and smooth operation.

While providing secure attachment of the wiper assembly to the wiper arm, the after market parts supplier also has to accommodate a variety of vehicle equipment types. Hence, a pin type of connector in a replacement wiper assembly should fit securely and provide for both sizes of pin type connectors either alone or with the use of a few simple adapters.

The main bridge portion of a wiper commonly includes at least one passageway for fitment of a pin type connector. The bridge assembly includes either an integral or snap in latch assembly to secure the pin connector. Some wiper assemblies include two holes of different sizes to accommodate the different pins, others include adapters with provision for the differently sized pins. Many of these provide satisfactory connection between the wiper and wiper arm. However, many of the prior art latching mechanisms also include complex mechanisms which are only taken on and off the wiper arm with difficulty or which are prone to breakage after repeated use.

An object of the present invention is to provide a simple latch mechanism which is resilient, even after many uses, and which is easily removed from the wiper arm. Further, the attachment between the pin connector and the wiper arm is secure.

SUMMARY OF THE INVENTION

The present invention is a latch mechanism for securing a wiper assembly to a vehicle wiper arm with a pin type connector. The latch includes a pair of retaining members at each end for securing the latch within a cavity in the main bridge of a wiper assembly. The central portion of the latch includes a flexible body portion with chamfered edges to engage and secure a pin connector to the wiper assembly. Wing portions extend laterally from the body portion so that the latching surfaces may be sprung away from the retaining position. In this manner, the pin connector may be released from a latched position within the wiper bridge. The wiper bridge includes a passageway therein that accommodates an inserted pin connector and which conflicts with the flexible body portion of the latch member. The resiliency of the latch member against the inserted pin inhibits the removal of the pin connector.

The present invention presents a simple solution for securely retaining a pin connector within a wiper assembly. A snap in place one piece element urges against the pin and resists removal of the pin.

The following is a detailed specification of the invention including appended claims and drawings which form a part thereof.

DETAILED DESCRIPTION OF THE PREFERRED EMBODIMENT

Figure 1:
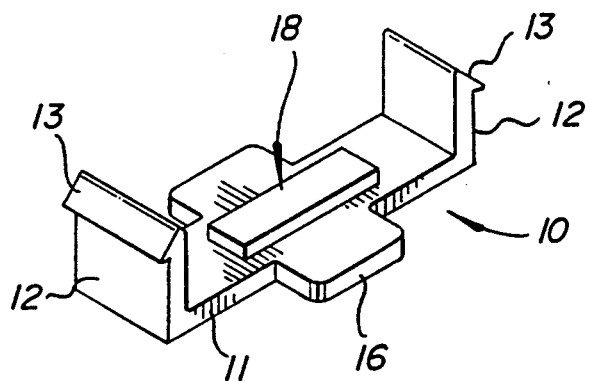
FIG. 1 is a perspective view of a latch assembly according to the present invention.
Figure 2:
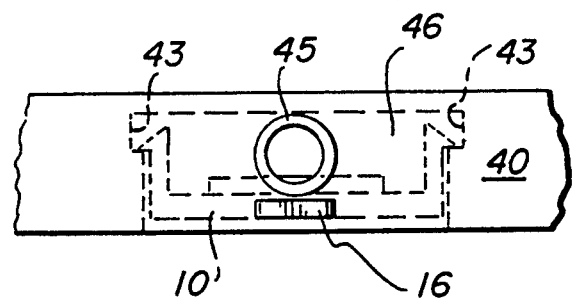
FIG. 2 is a side elevational view of a latch assembly according to the present invention installed in the main bridge of a wiper assembly.
Figure 3:
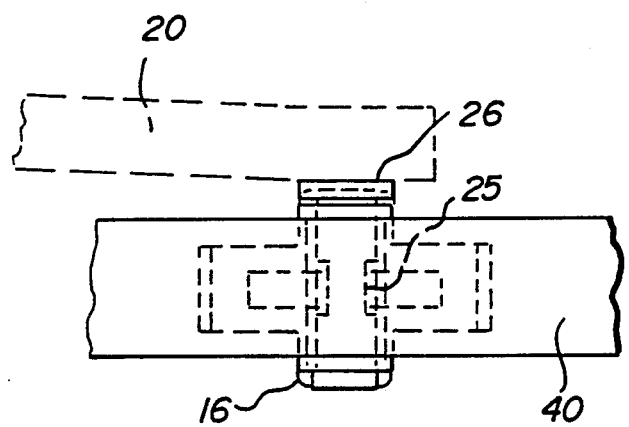
FIG. 3 is a top plan view of a latch assembly according to the present invention installed in the main bridge of a wiper assembly.

The latch assembly 10 is installed within a cavity 46 in the main bridge 40 of a wiper assembly. The cavity 46 is longitudinally placed within the wiper bridge 40 and includes a pair of cut outs 43 at each end thereof. The cavity 46 intersects a passageway 45 which is placed in a transverse relationship to the main wiper bridge 40.

The latch assembly 10 includes a pair of upstanding end portions 12 which are capped by retainer elements 13. The end portions 12 are connected by a flexible main body portion 11 which includes a pin retainer raised portion 18. The flexible main body portion 11 also includes a laterally extending pair of wings 16.

The latch assembly is constructed of any suitable flexible and resilient material. Plastics are suitable, as are light gauge spring metals. In this manner, the latch may be used repeatedly or stressed repeatedly without likelihood of failure.

The latch assembly 10 is inserted into cavity 46 within the wiper bridge 40 from either the top or bottom of the bridge depending on the opening orientation of cavity 46. The upstanding end portions 12 and retainer elements 13 engage the complementary cutouts 43 contained within the cavity. The resiliency of the latch assembly material and the physical configuration of the latch elements will retain the latch in position within the cavity 46.

Once in position within the wiper bridge 40, the flexible body portion 11 and pin retainer portion 18 will slightly block passageway 45 extending transversely through the body of the wiper bridge. As such, an inserted pin connector 26 will be contacted by the retainer portion 18 upon insertion of the pin into passageway 45. Owing to the smooth end of pin 26, the pin will displace the retainer portion 18 downwardly, and the pin will continue into the passageway 45 until a rearward flange of the pin restricts further movement of the pin.

The pin 45 usually includes a narrowed portion 25 along a midsection thereof, and this narrowed section seats against the pin retainer 18. In this manner, the pin is securely fastened to the wiper bridge 40.

To remove the pin, the wings 16 are urged away from the wiper bridge so as to remove pin retainer 18 from a blocking condition of passageway 45. The pin 26 can then be removed without fouling the latch assembly 10.

To aid in pin 26 insertion and removal, either or both of the narrowed pin portion 25 or the edges of pin retainer 18 may be chamfered for cooperating action. In this manner, the pin 26 may be inserted and withdrawn with only moderate downward pressure being exerted on the wings 16 to disengage the latch assembly 10.

The pin 26 can be either attached directly to the wiper arm 20 (as shown), or may be a separate member for association with a separate wiper arm retainer.

While the foregoing is a detailed description of the preferred embodiment of the invention, many alternative embodiments will occur to those of skill in the art, and will fall within the scope of the following claims.

We claim:

1. A latch assembly for connecting a pin connector to a wiper assembly having a main bridge portion including a longitudinal cavity therein bounded by a pair of sidewalls and connecting endwalls, and a transverse passageway for accommodating said pin connector intersection said cavity, said latch assembly comprising:

a pair of upstanding end portions capped by retainer means for retaining said upstanding ends within said cavity;

a flexible body portion connected between said upstanding end portions and including a centrally positioned pin retainer portion for engaging said pin when said pin is inserted into said transverse passageway, said body portion further including at least one wing portion extending laterally therefrom to a position extending beyond an outer surface of one of said sidewalls of said cavity so that said flexible body portion can be urged by manual manipulation of said wing portion to disengage said pin retainer portion from said pin as necessary.

2. A latch assembly as in claim 1, wherein:

said pin retainer portion is an upstanding rib having chamfered edges to better enable said pin to be inserted and withdrawn from said transverse passageway.

* * * * *